Feb. 1, 1966   F. T. SARGENT   3,232,577
GATE VALVE WITH SECTIONAL BODY
Filed May 10, 1963   5 Sheets-Sheet 1

INVENTOR.
FRANK T. SARGENT
BY
Woodling Krost Granger Krost
ATTORNEYS

Feb. 1, 1966 F. T. SARGENT 3,232,577
GATE VALVE WITH SECTIONAL BODY
Filed May 10, 1963 5 Sheets-Sheet 2

INVENTOR.
FRANK T. SARGENT
BY
Woodling Krost Granger Rust
ATTORNEYS

Feb. 1, 1966  F. T. SARGENT  3,232,577
GATE VALVE WITH SECTIONAL BODY
Filed May 10, 1963  5 Sheets-Sheet 3

INVENTOR.
FRANK T. SARGENT
BY
Woodling Krost Granger & Rust
ATTORNEYS

Feb. 1, 1966 F. T. SARGENT 3,232,577
GATE VALVE WITH SECTIONAL BODY
Filed May 10, 1963 5 Sheets-Sheet 4

INVENTOR.
FRANK T. SARGENT
BY
Woodling, Krost, Granger & Rust
attys.

Feb. 1, 1966   F. T. SARGENT   3,232,577
GATE VALVE WITH SECTIONAL BODY
Filed May 10, 1963   5 Sheets-Sheet 5

INVENTOR.
FRANK T. SARGENT
BY

United States Patent Office 3,232,577
Patented Feb. 1, 1966

3,232,577
GATE VALVE WITH SECTIONAL BODY
Frank T. Sargent, 4340 E. Vienna Road, Clio, Mich.
Filed May 10, 1963, Ser. No. 279,483
1 Claim. (Cl. 251—87)

This is a continuation in part of United States application Serial Number 43,147, filed July 15, 1960, and now abandoned.

The invention relates generally to valves and more particularly to quick opening gate valves which are particularly adapted for use with sewage storage devices such as septic tanks which may be used on travel trailers or other conveyances.

An object of the invention is to provide a completely open flow-through type gate valve for vertically falling liquids which are usually emptied by gravity from a storage tank and which liquids may be discharged onto the ground or into a conducting tube or pipe. The valve of the present invention is particularly adapted to handle waste sewage from a sewage storage tank installed in a travel trailer, boat, or other vehicle; however, it will be readily appreciated by those skilled in the art that it is susceptible of many other uses. The present valve conveniently handles and discharges paper and other solids which become lodged in the mechanisms of other types of gate valves.

Another object of the invention is to provide a gate valve which is short in its overall height, allowing it to be assembled in installations of limited space.

Another object of the invention is to provide a valve which has a cleaning or non-plugging action.

Another object of the invention is to provide a gate valve which is suitable for intermittent use such as is required in travel trailer installations since such units may go for long periods without use, resulting in evaporation of all liquids until completely dry. The valve of the present invention, when properly constructed, even though dry, is immediately ready for use without attention or service.

Another object of the invention is to provide a quick opening and closing gate valve with no obstructions in the valve opening when same is in the open position.

Another object of the invention is to provide a quick opening and closing gate valve with a suitable funnel construction to prevent clogging if any discharge occurs in a partially open position.

Another object of the invention is to provide a quick opening and closing gate valve which is self-cleaning if scraps of paper or other solids become lodged upon the gate valve slide or on other parts thereof.

Another object of the invention is to provide a quick opening and closing gate valve which can be operated by hand and which can be easily manufactured in a large range of sizes.

Another object of the invention is to provide a quick opening and closing gate valve with suitable stops or abutments built in for determining the open and closed positions of the gate valve slide. One modification of the valve as disclosed herein discloses a new and novel stop which employs a ball and a raceway, thus providing a substantially friction-free and non-jamming stop.

Another object of the invention is to provide a quick opening and closing gate valve which lends itself to operation by power control in the form of a solenoid, an air cylinder, or a hydraulic cylinder, or any combination thereof.

Another object of the invention is to provide a gate valve utilizing a gate valve slide having an annular fluid seal made therewith by the use of an annular sealing member engaging the same which annular sealing member has a low coefficient of friction. This provides for ease in sliding contact between the valve slide and the sealing member.

Another object of the invention is to provide a valve which will not lock if closed with too much pressure and does not require a mechanical advantage, such as that of a screw, to open.

Another object of the invention is to provide a valve which is sealed against leakage from both directions, that is when fluids are located on the inlet side of the valve as well as on the outlet side of the valve.

Another object of the invention is to provide a valve which has a mechanical connection extending exteriorly of the valve to operate the same with a construction whereby the valve is sealed against leakage of fluids where the mechanical connection exits the valve.

Another object of the invention is to provide a valve slide chamber which is positioned laterally of the fluid opening through the valve so as to provide a storage chamber for the valve slide in the open position thereof.

Another object of the invention is to provide a valve which includes a unique connection between the valve slide and the mechanical member for opening and closing the same thereby developing a floating action of the valve slide so as to provide a better valve sealing action.

Other objects and a fuller understanding of this invention may be had by referring to the following description and claim, taken in conjunction with the accompanying drawings, in which:

Figure 1:
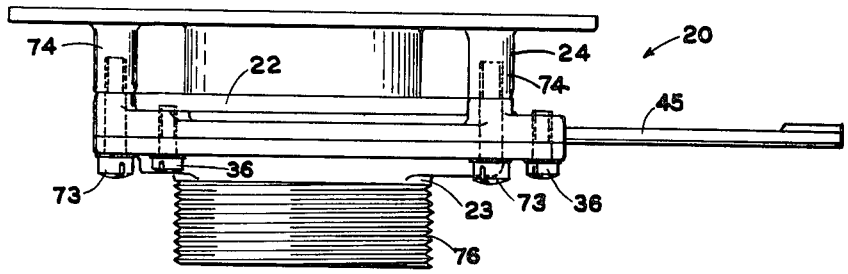
FIGURE 1 is a side elevational view of the valve of the present invention.
Figure 2:
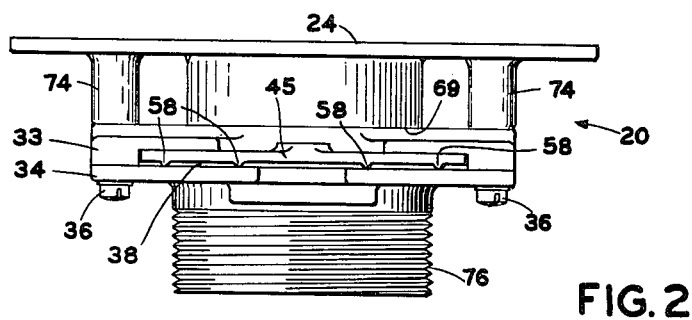
FIGURE 2 is an end view of the valve shown in FIGURE 1.
Figure 5:
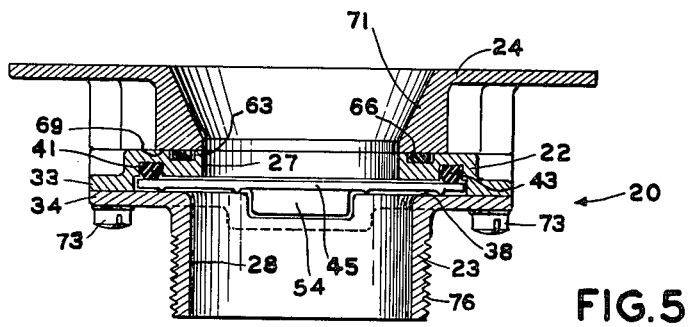
FIGURE 5 is a sectional view taken generally along the line 5—5 of FIGURE 3.
Figure 6:
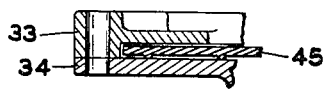
FIGURE 6 is an enlarged fragmentary sectional view taken generally along the line 6—6 of FIGURE 3.
Figure 3:
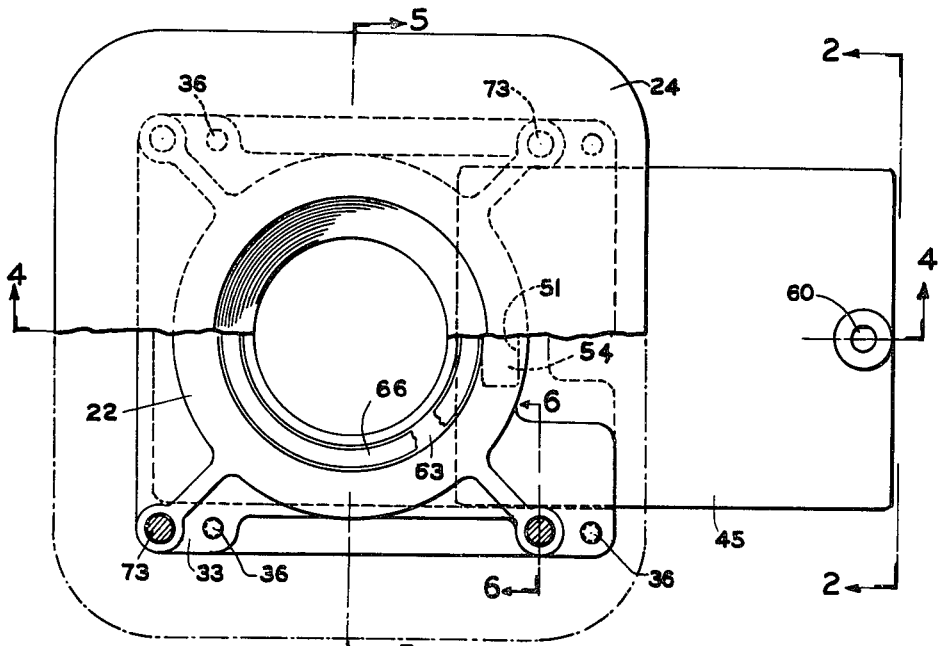
FIGURE 3 is a plan view of the valve, with parts broken away, shown in FIGURE 1.

The quick opening and closing gate valve of the present invention shown in FIGURES 1–6 has been indicated generally by the reference numeral 20 and includes in combination upper and lower housings 22 and 23, respectively, and an adapter housing 24.

Wall means 27 define a fluid opening through the upper housing and wall means 28 define a similar fluid opening through the lower housing. As will be noted particularly from FIGURE 4, the fluid opening 28 is slightly larger in diameter than the opening 27 in the upper housing 22. The fluid opening 28 is tapered outwardly at its upper end portion as at 31 and this forms what may be referred to as a funnel type entrance to the opening 28. The upper and lower housings 22 and 23 have flanges 33 and 34, respectively, in facing engagement with each other and a plurality of screws 36, in this instance four in number, are provided for securing the upper and lower housings together with the fluid openings 27 and 28 in axial alignment with each other.

Figure 4:
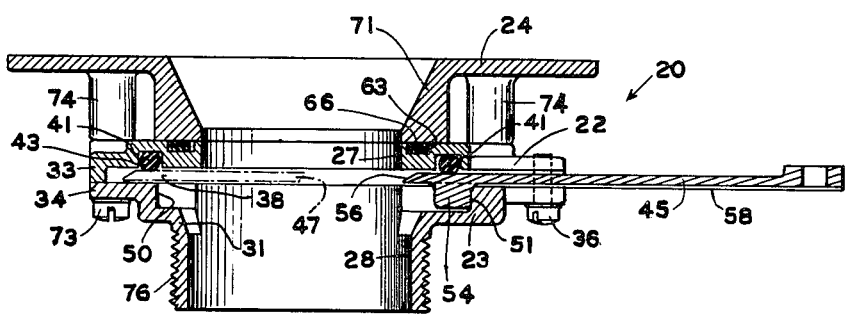
FIGURE 4 is a sectional view taken generally along the line 4—4 of FIGURE 3.

The flanges 33 and 34 on the upper and lower housings serve to space the housings apart to form a rectangular opening 38, which may also be referred to as a valve slide opening and which extends in a direction transverse to the extent of fluid openings 27 and 28 and which also extends on either side thereof. A first O-ring or sealing ring groove 41 is provided in the upper housing (FIGURE 4) and this groove extends annularly around the fluid opening 27 and as will be noted faces the rectangular or valve slide openings 38. A first O-ring or sealing ring 43 is positioned in the groove 41 and has a larger cross-sectional diameter or dimension than the depth of the groove 41. This means that the sealing ring 43 extends out of the groove and into the rectangular opening 38. A generally rectangularly shaped valve slide 45 is positioned in the rectangular opening 38 and is adapted to be moved between open and closed positions. FIGURE 4 shows the valve slide in the open position and the dot dash lines 47 indicate the position of the valve slide in the closed position. At least a portion of the sealing ring 43 is coated with a substance having a low coefficient of friction such as the high polymers of tetrafluoroethylene sold for example under the Du Pont trademark of Teflon. The portion that has this substance thereon is at least the portion which is in contact with the upper surface of the valve slide 45. The sealing ring 43 is in engagement with the valve slide throughout its entire circumference, thereby making what may be referred to as an annular fluid seal.

First and second abutment means 50 and 51, respectively, are formed on the lower housing 23 on opposite sides of the fluid opening 28. A stop member 54 is integrally formed on the first end portion of the valve slide 45 on the lower side thereof and in the closed position of the valve it will be noted that the stop member 54 is in engagement with the abutment 50 and in the open position the stop engages the abutment 51. The first end portion of the valve slide is tapered as at 56 to form a sharp leading edge on the valve slide on the side thereof away from the sealing ring 45. The reason for this construction is to provide a tapered wall for engagement with the sealing member so that the same is not cut or pinched when the valve slide moves to the closed position. The valve slide is also provided on its lower side with a plurality of ribs 58 which extend generally longitudinally thereof and these ribs are adapted to engage the lower housing 23 which forms one wall of the rectangular opening 38. This construction provides for a good sliding contact between the valve slide and the housing 23. The second end portion of the valve slide is exposed to the exterior of the valve 20 and is provided with an opening 60. This enables the valve slide to be opened and closed manually and also provides a convenient means for attachment with a power actuating source.

The upper surface of the upper housing 22 is provided with a second O-ring or sealing ring groove 63 which extends around the fluid opening 27 therein and which faces upwardly or in an opposite direction to the groove 43. A second O-ring or sealing member 66 is positioned in the groove 63 and is of a larger cross-sectional diameter or dimension than the depth of the groove 63 which means that the sealing member 66 extends above the upper surface of the upper housing 22. The adapter housing 24 has a lower surface 69 which is positioned in engagement with the second sealing member 66 and the upper surface of the upper housing which causes the sealing member 66 to be deformed, thereby making a good fluid sealing between the adapter housing and the upper housing 22. Wall means 71 in the adapter housing provide a tapered fluid opening therethrough, which is positioned in axial alignment with the fluid openings 27 and 28 in the upper and lower housings. The adapter housing is held in position by a plurality of screws 73, in this instance four in number, which extend through the upper and lower housings and into bosses 74 in the adapter housing 24. The adapter housing 24 may be suitably secured by any means to a source of fluid supply and the lower housing 23 in this instance has been provided with threads 76 for attaching the same to a liquid conduit. If the conduit is not provided and fluids are merely to be deposited on the ground, then no connecting means is necessary.

Figures 9, 10:
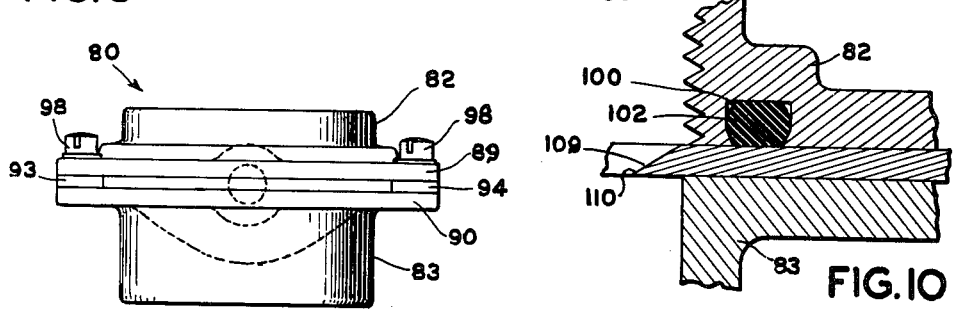
FIGURE 9 is an end view of the valve taken generally along the line 9—9 of FIGURE 8.
FIGURE 10 is an enlarged fragmentary view of a portion of FIGURE 8.
Figure 11:
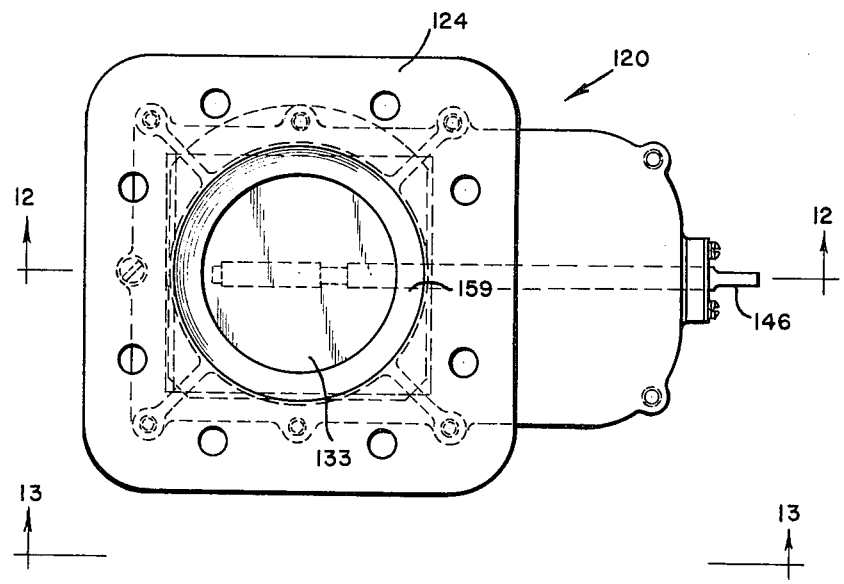
FIGURE 11 is a plan view of a modified form of the valve of the present invention.

FIGURES 7 through 10 illustrate a modification of the valve of the present invention and the valve has been indicated generally by the reference numeral 80. The valve 80 includes in combination, upper and lower housings 82 and 83 and wall means 85 define a circular opening through the upper housing and wall means 86 define a circular opening through the lower housing. Flanges 89 and 90 are provided, respectively, on the upper and lower housings and first and second spacers 93 and 94, respectively, are positioned between the flanges on either side of the openings thereby defining or forming a rectangular opening or valve slide opening 96 which opening extends generally transverse to the openings 85 and 86. Screws 98, and in this construction six in all are used, extend through the flanges of the upper and lower housings and through the first and second spacer members thereby holding the same in assembled relationship with the openings 85 and 86 in axial alignment. Wall means 100 define an O-ring or sealing ring groove in the upper housing which extends completely around the opening 85 and which groove faces the rectangularly shaped opening 96. FIGURE 10 best shows the construction of the sealing ring groove 100 and it will be noted that the groove has a narrower entrance portion than the main portion of the groove. It will also be noted that the cross-sectional diameter of the sealing member 102 which is positioned in the groove 100 is larger than the depth of the groove thereby resulting in a construction whereby the sealing member 102 extends into the rectangular opening 96.

Figure 7:
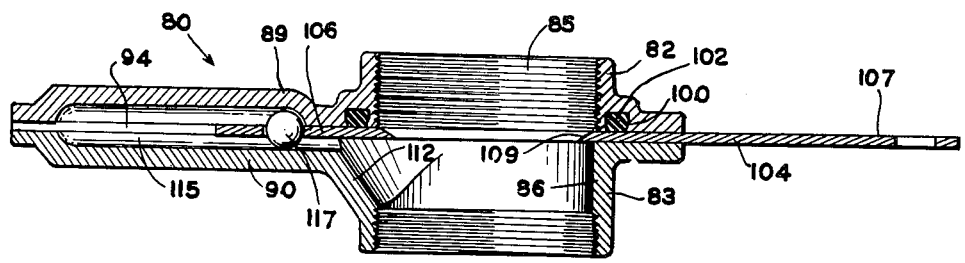
FIGURE 7 is a side elevational view in section of a modified form of the valve of the present invention.
Figure 8:
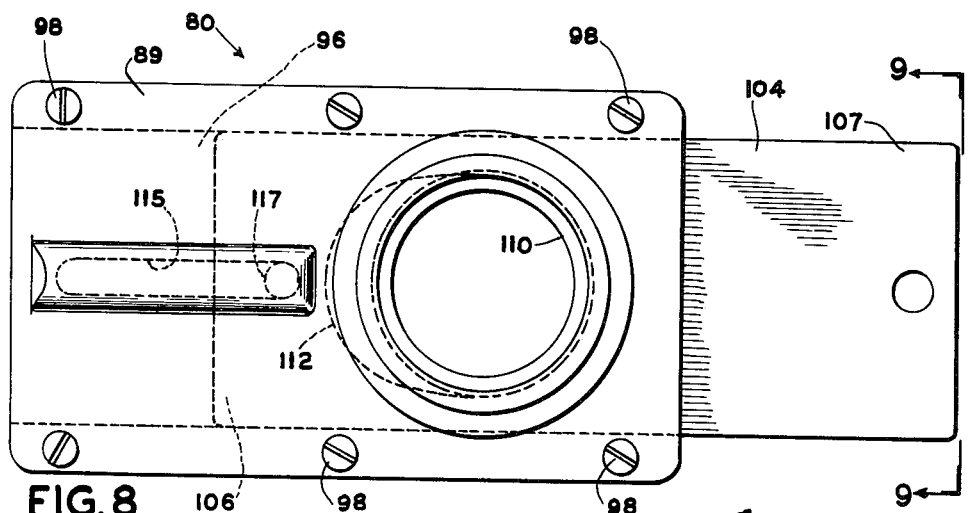
FIGURE 8 is a plan view of the valve shown in FIGURE 7.

A rectangular valve slide 104 is positioned in the rectangular opening 96 and has first and second end portions 106 and 107, respectively, and is movable between open and closed positions. As shown in FIGURE 7, the valve is in completely open position and when moved to the extreme left, as viewed in this figure, the valve is in closed position. Wall means 109 define an opening through the valve slide with the wall means tapering to a sharp annular edge 110 at the lower side of the valve slide. The sealing member 102, since it extends into the rectangular opening, engages the upper side of the valve slide and is compressed thereby, thus providing an annular fluid seal therebetween.

The upper portion of the circular opening 86 is tapered outwardly as at 112, at least a portion of the way around the periphery of the opening to provide a funnel like construction larger than the circular opening 85 in the upper housing and this insures passage of material through the valve when the same is in the partially open position. It will be noted in FIGURES 7 and 8 that this tapered portion extends substantially one hundred and eighty degrees around the opening. Wall means 115 defines a ball raceway in the flanges 89 and 90 of the upper and lower housings and a ball 117 is located in the raceway and is confined by the first end portion 106 of the valve slide thereby determining the travel of the valve slide between open and closed positions. The second end portion 107 of the valve slide extends from the housing at the right and as viewed in FIGURES 7 and 8, the valve may be moved manually between open and closed positions by manipulating this end of the valve slide. The valve slide may also be attached to a power source which may be utilized in moving the valve to open and closed positions.

Figure 12:
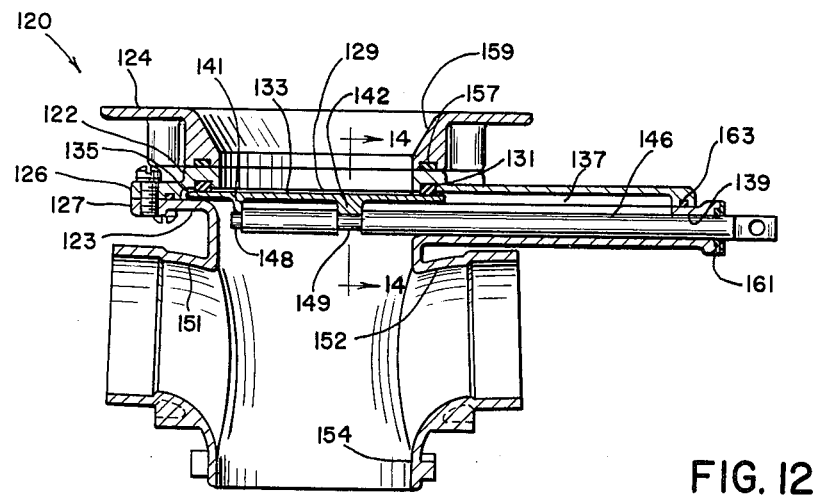
FIGURE 12 is a view taken generally along the line 12—12 of FIGURE 11.
Figure 13:
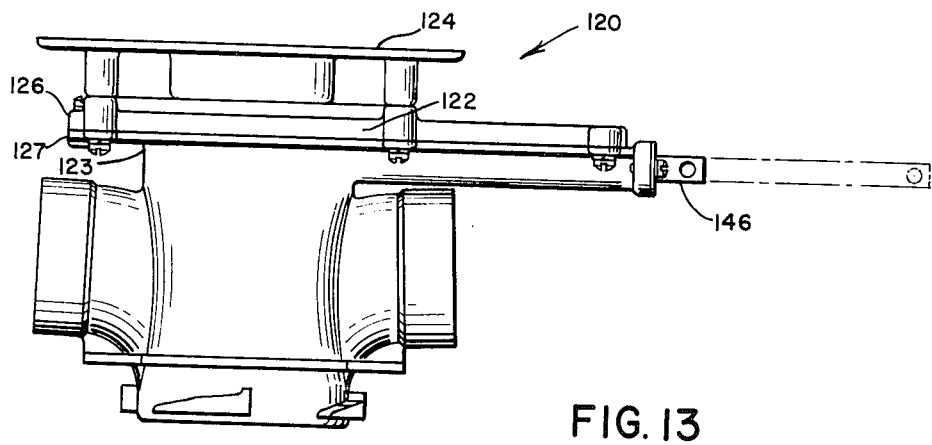
FIGURE 13 is a view taken generally along the line 13—13 of FIGURE 11.

FIGURES 11, 12, 13 and 14 show another modified form of the valve of the present invention which is indicated generally by the reference number 120 and as in the previous valves, includes upper and lower and adapter housings 122, 123 and 124, respectively. Wall means are provided in the upper and lower housings as in the previous valve designs which wall means serve to define fluid openings through these housing members and they are located in axial alignment with each other. Each of the upper and lower housings is provided with flanges 126 and 127, respectively, which are in facing engagement with each other and screws extend through these flanges to hold the upper and lower housing members together. The flanges space the upper and lower housing members apart to form a rectangular opening 129 which extends crosswise of the fluid opening. As in the previous designs, a first O-ring groove is provided in the upper housing and faces the rectangular opening and a first O-ring 131 is located in this groove in such a manner as to face the rectangular opening 129. A generally rectangular shaped valve slide 133 is positioned in the rectangular opening 129 and is adapted to be moved between open and closed positions. The valve slide is located in closed position as seen in FIGURE 12 and in this position is in sealing engagement with the O-ring 131. The O-ring 131 in other words makes an annular seal with the upper surface or upper side of the valve slide. The first end portion of the valve slide comprises a tapered wall 135 for presentation to the O-ring 131 as the valve slide moves from open to closed positions. As seen in the accompanying figures, the flanges of both the upper and lower housings are extended laterally to the right to form what may be referred to as a valve slide chamber 137. This chamber is for the purpose of housing the valve slide 133 when it is moved to the open position. Wall means 139 serves to define a cylindrical opening into the valve slide chamber for a purpose which will be described shortly. The valve slide is provided with first and second spaced projections 141 and 142 extending from the lower side thereof as seen in the FIGURES 12 and 14. Each of the spaced projections 141 and 142 is provided with an arcuate surface portion 144. A cylindrical push-pull shaft 146 sometimes referred to as an operating member, extends into the valve slide chamber through the cylindrical opening 139 and is provided with first and second spaced reduced diameter or engagement portions 148 and 149, respectively, each of which comprises an arcuate surface. The arcuate surface portions of the first and second projections 141 and 142 respectively engage the first and second reduced diameter portions of the valve slide member and serve to connect the valve slide and the push-pull shaft together. This results in movement of the valve slide in accordance with movement of the push-pull shaft. In this particular embodiment, the lower portion of the lower housing 123 is formed into a fitting which has first and second side openings 151 and 152 and a lower opening 154.

A second O-ring groove is provided in the lower surface of the adapter housing and a second O-ring 157 is positioned in this O-ring groove. This provides for the seal between the lower surface of the adapter housing 124 which is positioned on top of the upper housing and which is connected in fixed relation thereto by screw means as in the previous embodiments. As before, the adapter housing is provided with a tapered opening 159 extending therethrough.

Figure 14:
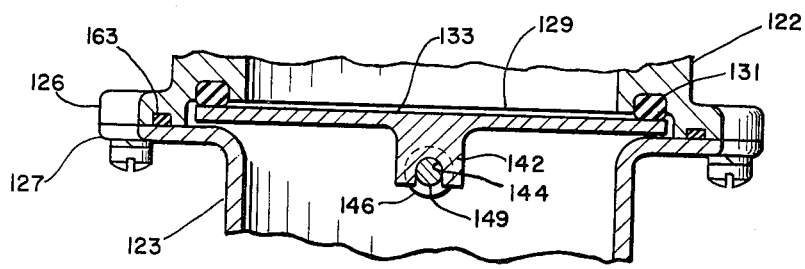
FIGURE 14 is a view taken generally along the line 14—14 of FIGURE 12.

It will be seen particularly in the embodiment of FIGURES 11 through 14 that an excellent fluid seal is obtained for the valve whether the fluid is entering through the inlet side of the valve, for example through the opening 159 in the adapter housing, or whether the fluid results from a back-up of fluid from any of the openings in the lower housing. A seal 161 of course is provided around the push-pull shaft 146 where it enters the cylindrical opening 139 and a seal 163 is provided between the extensions of the flanges 126 and 127 which serve to form the valve slide chamber 137. As a result, the valve is substantially leak-proof. Another feature of the invention has to do with the connection between the push-pull valve 146 and the valve slide 133. The connection effected here and as best seen in FIGURES 12 and 14 enables the valve slide to float or move angularly about the axis of the push-pull shaft. This enables a good seal to be maintained between the upper surface of the valve slide and the first O-ring 131. In this particular embodiment, the top surface of the valve slide is preferably coated with Teflon.

It will therefore be seen that the objects of the present invention have been accomplished in that the valves disclosed and claimed herein provide a completely open flow-through type gate valve for vertically falling liquids. Because of this construction, it can be said that the valve has a substantially non-plugging action and by the use of the knife-like edge on the valve slides, paper and other solids are sheared off or removed from the valve slide and caused to pass therethrough. It will also be noted that with the construction utilized, there is no metal to metal contact on the moving parts on the inlet side of the valve. For example, when the valve slide is in the closed position, any fluids in the upper housing will be restrained from flowing past the valve slide by the sealing ring 43 in the valve of FIGURES 1-6 and by the sealing member 102 in the valve of FIGURES 7-10. It will thus be seen that any corroding effect of the liquid will not substantially affect the opening action of the valve slide. It will also be seen that because of the present construction, a non-clogging type of design is provided when the valve slide is in a partially open position. The present valve is susceptible of operation by hand or by a suitable power type means and can be easily manufactured in a large range of sizes. With the present construction, the valve slide is not susceptible of being locked in a closed position if too much pressure is applied as happens in many screw type gate valves and the use of the novel stop on the valve slide and the abutments in the valve housing provides a convenient means of determining the limit of the valve slide in open and closed positions. The use of the ball and ball raceway as shown in the valve of FIGURES 7-10 is an important modification in providing a non-jamming type of gate valve construction. In the valve of FIGURES 1-6, the ribs 58 on the underside of the slide 45 provide a convenient means of manufacturing the slide from a casting. This is true since it is important that the overall thickness of the slide not vary substantially, thus, the rib construction provides a means for making a coined thickness held precisely in a casting after coining.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A quick opening gate valve including in combination upper and lower housings and an adapter housing, wall means defining a fluid opening through said upper housing and wall means defining a fluid opening through said lower housing, said upper and lower housings having flanges therearound in facing engagement with each other, screw means extending between said flanges to secure said upper and lower housings together with said fluid openings in axial alignment, said flanges spacing said upper and lower housings apart to form a rectangular opening which extends transverse to said fluid openings, a first O-ring groove in said upper housing extending around said fluid opening therein and facing said rectangular opening, a first O-ring positioned in said first O-ring groove and being of a larger cross-sectional diameter than the depth of said groove, a generally rectangularly shaped valve slide positioned in said rectangular opening and adapted to be moved between open and closed positions, said first O-ring in the closed position of said valve slide being in engagement throughout its entire circumference with the upper side of said valve slide thereby making a fluid seal, said first end portion of said valve slide comprising a tapered wall for presentation to said first O-ring, said flanges extending laterally to form a valve slide chamber, wall means defining a cylindrical opening into said valve slide chamber, said valve slide having first and second spaced projections extending from the lower side thereof, each said spaced projection having an arcuate surface portion, a cylindrical push-pull shaft extending into said valve slide chamber through said cylindrical opening and having first and second spaced reduced diameter portions, said first and second projection arcuate surface portions respectively engaging said first and second reduced diameter portions and serving as the connection between said valve slide and shaft whereby movement of said shaft is transmitted to said valve slide to move same between open and closed positions, said adapter housing having a lower surface in engagement with the upper surface of said upper housing, a second O-ring groove in one of said lower surface of said adapter housing and said upper surface of said upper housing and extending around said fluid opening in said upper housing, a second O-ring positioned in said second O-ring groove and being of a larger cross-sectional diameter than the depth of said groove, the other of said lower surface of said adapter housing and said upper surface of said upper housing engaging and deforming said second O-ring thereby making a fluid tight seal, wall means in said adapter housing providing a downwardly tapering fluid opening therethrough which is positioned in axial alignment with said fluid openings in said upper and lower housings, and screw means extending between said adapter housing and said upper and lower housings for holding said adapter housing in position.

References Cited by the Examiner

UNITED STATES PATENTS

| | | | |
|---|---|---|---|
| 746,884 | 12/1903 | Sharp | 251—86 |
| 1,751,122 | 3/1930 | Barker | 251—328 X |
| 2,472,677 | 6/1949 | Phillips | 251—284 X |
| 2,652,946 | 9/1953 | Beatty | 251—326 X |
| 2,701,117 | 2/1955 | Bashark | 251—326 X |
| 2,823,887 | 2/1958 | Osinski | 251—328 X |
| 2,969,083 | 1/1961 | Joyce | 251—147 X |
| 2,970,801 | 2/1961 | Lampert | 251—326 |

FOREIGN PATENTS

| | | |
|---|---|---|
| 533,510 | 11/1956 | Canada. |
| 1,053,141 | 9/1953 | France. |
| 1,089,995 | 10/1954 | France. |
| 1,137,070 | 1/1957 | France. |
| 1,102,145 | 5/1955 | France. |
| 209,007 | 1/1924 | Great Britain. |

M. CARY NELSON, *Primary Examiner.*